UNITED STATES PATENT OFFICE.

CARLETON ELLIS, OF LARCHMONT, NEW YORK, ASSIGNOR TO CHADELOID CHEMICAL COMPANY, OF NEW YORK, N. Y., A CORPORATION OF WEST VIRGINIA.

PAINT OR VARNISH REMOVER.

1,113,971.     Specification of Letters Patent.     Patented Oct. 20, 1914.

No Drawing.     Application filed March 27, 1907. Serial No. 364,749.

*To all whom it may concern:*

Be it known that I, CARLETON ELLIS, a citizen of the United States, residing at Larchmont, in the county of Westchester and State of New York, have made certain new and useful Inventions Relating to Paint or Varnish Removers, of which the following is a specification.

This invention relates to paint or varnish removers and relates especially to removers comprising carbolic, cresylic or analogous acid bodies combined with suitable palliatives by which their corrosive or caustic action may be neutralized.

Carbolic and cresylic acids and their higher homologues, guaiacol, beechwood tar acid and other acid bodies of similar character derived from wood, coal, etc., by destructive distillation, including creosotes derived from wood and coal tar, shale oil and blast furnace products are sometimes desirable in removers that are used under extreme service conditions because of their energetic loosening action on many paints and finishes. These materials are, however, disadvantageous because of their caustic and corrosive action on the workmen and finish surfaces to which they are applied under certain circumstances. By the use of suitable palliative material, however, such corrosive properties may be mitigated and neutralized without destroying the desirable loosening action on the finish and the remover rendered much more satisfactory in its action.

Carbolic acid may be combined with the desired quantity of inorganic alkaline material, such for example, as sodium or potassium hydrate, oxid of magnesia or organic alkaline or neutralizing material, such as anilin or methylamin. Even a small proportion of such palliative material seems to combine with the corrosive acid body so as to form complex compounds of a much less corrosive and injurious character, a similar action being effected by formaldehyde which forms condensation products. Suitable carbolates may also be formed by esterification of alcoholic bodies, such, for example as by the esterification of ethyl, methyl or amyl alcohol with carbolic acid in a suitable digester. Mixed carbolates are preferably produced in this way combined with the additional acid material to the desired extent, these esters having a very desirable ameliorating effect on the acid bodies and being in themselves desirable solvent ingredients for removers in many cases. Methyl carbolate, for instance, is a mobile liquid of pleasant aromatic odor having a boiling point of about 152° C. and considerable solvent action. Other bodies, such as benzoic acid, are capable of suitably modifying these undesirable properties of acid bodies of this description by esterification, ortho cresylbenzoate being formed in this way. Other desirable palliatives are alkaline starch formed, for example, by stirring starch into a strong solution of caustic soda to form a thick pasty mass which may be combined with acid bodies of this character in removers, starch and ammonia mixtures having a similar action. Proteid bodies also have a desirable action, albumen and gelatin forming when stirred into carbolic acid a desirable thick pasty mass, giving consistency to the remover as well as having a very desirable palliative action on the carbolic acid or other acid bodies referred to, it being understood, of course, that such acid bodies may be replaced to the extent of a few per cent. or so with other acids preferably of an organic character, such as tartaric, oxalic, lactic and other similar acids.

In removers it is desirable to use in addition to such acid bodies and palliative material suitable paint and varnish solvent material, preferably of a mixed character comprising loosening and penetrating finish solvent material. Among loosening finish solvents, that is, solvents having a generally alcoholic character or action in removers are true alcohols, such as methyl, ethyl, propyl, butyl, amyl, benzyl, and the like, preferably in their commercial forms, including denatured alcohol and also other loosening solvents having generally alcoholic action in removers, such as the various ketonic solvents, including acetone, methyl acetone, methylethyl ketone, oil of acetone; as well as aldehydes and esters of various kinds. Among the penetrating finish solvent material, that is, finish solvents having a generally benzolic character or action in removers are included benzol and its homologues and the somewhat corresponding petroleum solvents, such as gasolene, carbon-bisulfid, carbon-tetrachlorid, acetylene-tetrachlorid and other chlorinated solvent compounds, turpentine, wood turpentine and the like.

Although not necessary in all cases, various stiffening materials, such as wood flour, starch, whiting, fullers' earth, magnesia, infusorial earth may be used, and also waxy, soapy or gelatinous stiffening material, it being, of course, understood that all the ingredients are preferably thoroughly incorporated by agitation at the desired slight rise of temperature. An illustrative remover of this character may comprise carbolic acid 20 gallons, benzol 13 gallons, denatured alcohol 20 gallons, wood flour 10 pounds and ceresin wax 5 gallons with which two to six pounds of finely ground sodium hydrate may be incorporated. Another illustrative remover may comprise carbolic acid 35 gallons, benzol 28 gallons, a loosening solvent, such as acetone, 30 gallons, wood flour 12 pounds and ceresin wax 2 gallons, with which 10 gallons of methylamin are combined. Another illustrative remover may comprise carbolic acid 25 gallons, benzol 25 gallons, wood alcohol 20 gallons, ceresin wax 4 gallons, to which may be added 50 pounds of light oxid of magnesia. Another remover may comprise carbolic acid 20 gallons, benzol 20 gallons, acetone 15 gallons, amyl alcohol 5 gallons, to which is added 10 gallons of thick alkali starch. Still another illustrative remover may comprise carbolic acid 35 gallons, with which is incorporated from 5 to 10 gallons of a 40% solution of formaldehyde and the mixture warmed and thinned with benzol 25 gallons and acetone 25 gallons.

This invention has been described in connection with a number of illustrative ingredients, formulas, proportions and processes, to the details of which disclosure the invention is not, of course, to be limited.

What is claimed is:—

1. The finisher remover formed from ingredients comprising approximately carbolic acid 35 gallons, benzol 28 gallons, acetone 30 gallons, wood flour 12 pounds, ceresin wax 2 gallons and methylamin 10 gallons.

2. The finish remover formed from ingredients comprising approximately carbolic acid 35 gallons, benzol 28 gallons, loosening solvent material 30 gallons, stiffening material including wax, and methylamin 10 gallons.

3. The finish remover formed from ingredients comprising carbolic acid, penetrating finish solvent material, loosening finish solvent material, stiffening material including waxy bodies and methylamin.

4. The finish remover formed from ingredients comprising carbolic acid, penetrating and loosening finish solvent material, stiffening material and methylamin.

5. The finish remover consisting in larger part of volatile organic finish softening material incorported with stiffening material and finish loosening phenolic material and methylamin.

6. The substantially fluent finish remover substantially consisting of composite organic finish solvent material including benzol and acetone incorporated with waxy stiffening material, phenolic finish softening material and an incorporated palliative therefor capable of combining chemically therewith, minimizing its corrosive action without destroying the finish loosening action thereof.

7. The finish remover formed from ingredients comprising phenolic finish loosening material and methylamin.

- CARLETON ELLIS.

Witnesses:
HARRY L. DUNCAN,
JESSIE B. KAY.